Nov. 11, 1958

F. C. E. M. BERGER ET AL 2,860,324

POWER LINE SIGNALLING SYSTEM

Filed Nov. 25, 1953

Inventor
F. C. E. M. BERGER
P. A. H. ROUSSEL
By Philip M. Bolton
Attorney

Nov. 11, 1958  F. C. E. M. BERGER ET AL  2,860,324
POWER LINE SIGNALLING SYSTEM
Filed Nov. 25, 1953  8 Sheets-Sheet 3

Inventor
F. C. E. M. BERGER
P. A. H. ROUSSEL
By Philip M. Bolton
Attorney

Nov. 11, 1958   F. C. E. M. BERGER ET AL   2,860,324
POWER LINE SIGNALLING SYSTEM
Filed Nov. 25, 1953   8 Sheets-Sheet 6

Inventor
F. C. E. M. BERGER —
P. A. H. ROUSSEL
By Philip M Bolton
Attorney

United States Patent Office 2,860,324
Patented Nov. 11, 1958

2,860,324
POWER LINE SIGNALLING SYSTEM

François Charles Edmond Maurice Berger and Paul Antoine Henri Roussel, Paris, France, assignors to International Standard Electric Corporation, New York, N. Y., a corporation of Delaware Application November 25, 1953, Serial No. 394,446

Claims priority, application France December 24, 1952

3 Claims. (Cl. 340—310)

The present invention refers to various improvements in receiving devices for signals transmitted over power lines. It has been found that noise develops when the effective voltage applied to these power lines exceeds a certain critical value, and beyond this value it increases rapidly with said voltage. On a given line conductor, noise appears during the time intervals when the instantaneous voltage between this conductor and ground remains between a threshold voltage Vs and the peak voltage Vm applied to this conductor. The peak value Vm is the one where noise is at a maximum, while Vs is the value below which noise disappears.

On a power line of normal design, voltage Vs remains slightly above $$\frac{Vm}{2}$$

If "f" is the A. C. frequency applied to the line, the intervals corresponding to noise appear at the rate of 2 "f" on a single conductor and for a polyphase line at the rate of 2 "pf." Noise thus generated, already perceivable in the audio-frequency band, appears to be more or less evenly distributed over all frequency ranges and is not attenuated by band-pass filters, which is the common method of protecting a signal from disturbances, and, furthermore, part of the noise rejoins the signal at the output of these filters. Since the signal-to-noise ratio should be sufficiently high, correct signal reception is inconceivable if low-level signals are sent over an alternating high-voltage line.

Various methods have been used to improve the signal-to-noise ratio. Some of them are used at the transmitting end. They provide, for example, suppression of the carrier component and of one of the side-bands in an amplitude-modulation system; other methods use amplifiers distributed along the line. This raises the signal level at the input of the amplifiers, prior to re-transmission.

The present invention is based on periodic repetition of the noise appearing on the various conductors of a line carrying an alternating high voltage, making use of this periodicity to attenuate or to eliminate the noise effect due to this voltage on the reception of signals sent over the line. It intervenes only at the receiving point and is therefore of much greater significance, because it is in the transmission line where the more important noise components are present.

One of the features of the invention lies in a receiving device for signals sent over a power line conductor, using a switching device synchronized with the line voltage frequency and connecting said conductor to the receiver during the time interval when the voltage between conductor and ground is far from its peak value, thus reducing the noise and improving the signal-to-noise ratio.

Another feature of the invention lies in a receiving device for signals sent over a single-phase or polyphase power line and propagated over various conductors of said line, using a switching device synchronized with the power current frequency and connecting said conductors in succession to the receiving device during the time intervals when the voltage of one of these conductors with respect to ground is far below its peak value, the signal voltage applied to the receiver at a given instant being independent of the conductor from which it was taken, the signal thus being applied to the receiver without interruption, the noise level being low or null and the signal-to-noise ratio thus being improved.

Various other features of the invention will become apparent from the following description, given as a non-limitative example with reference to the accompanying drawing, in which.

Figure 1:
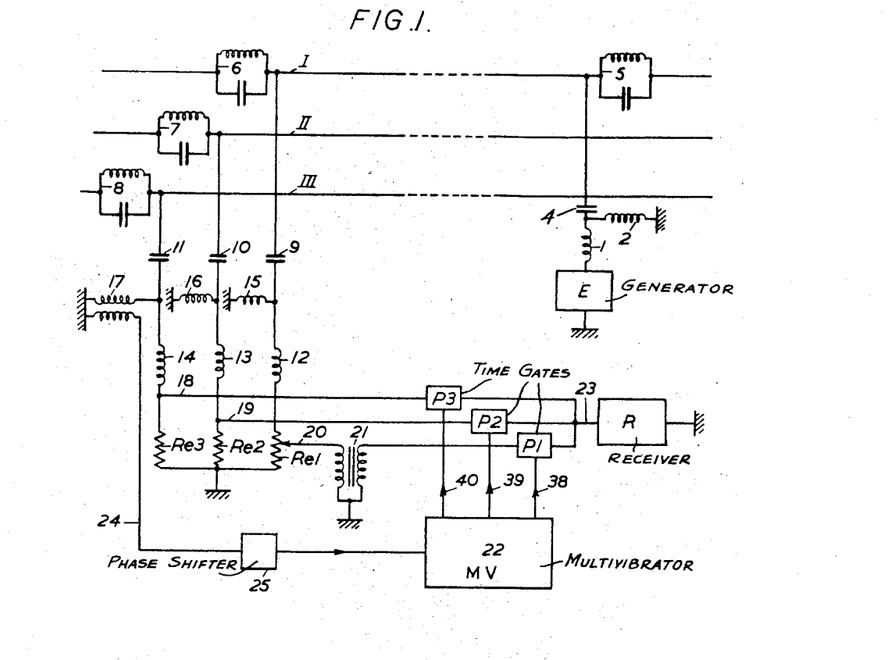
Fig. 1 is a diagram of the receiving device on a symmetrical three-phase line in the case of signal transmission between "phase and ground"

The operation of a high-frequency signal receiver on a three-phase symmetrical high-voltage line with transmission occurring between phase and ground will now be explained with reference to Figs. 1 and 2.

Generator E is connected between ground and wire I by means of a coupling condenser 4 and a tuning circuit 1, forming a series resonant circuit tuned to the signal frequency, and by means of a bleeding coil 2 whose impedance is low at the A. C. line frequency and high at the signal frequency, having one end grounded and the other connected to the common junction point of tuning circuit 1 and condenser 4, thus fixing the potential at this common point. A parallel resonant circuit 5 is placed on wire I to prevent signal current shunt losses.

At the receiving point parallel resonant circuits 6, 7 and 8, identical with 5, are placed respectively on wires I, II and III. Three identical coupling condensers 9, 10 and 11 are connected to the various wires and are connected separately to ground through identical tuning circuits 12, 13 and 14 and through resistances Re1, Re2 and Re3. Identical bleeding coils 15, 16 and 17 are connected to the various junction points of the various condensers and tuning circuits and to ground. The signal voltages are taken from resistances Re1, Re2 and Re3 and fed to the receiver through lines 18, 19 and 20.

As is known, on a very long three-phase symmetrical line tapped between each wire and ground, the high-frequency voltages measured on wires II and III are of equal value, their amplitude being one-half that of the high-frequency voltage measured on wire I and their polarity being opposite to that of the voltage on wire I (A. Chevallier. Teletransmissions par ondes porteuses.

Dunod Editeur, Paris, p. 29). These results hold true for a line of finite length whose wires are grounded through like impedances of proper value, according to French Patent No. 955,640, filed by applicant on October 28, 1947.

Since the losses in the tuning circuits are negligible, the signal voltages appearing on resistances R$e1$, R$e2$ and R$e3$ are respectively $+V$, $-V/2$, $-V/2$.

In order to take from 20 a voltage of an amplitude equal to those taken from 18 and 19, the connection to resistance R$e1$ is effected at the mid-point of said resistance, connected as a potentiometer, while the connections to resistances R$e2$ and R$e3$ are made at the points common to each resistance and its corresponding tuning circuit, that is to say, common point of R$e3$ and tuning circuit 14, and common point of R$e2$ and tuning circuit 13. Thus, 18 and 19 have voltage $-V/2$ and 20 has voltage $+V/2$.

In order to reverse the voltage polarity on 20, a transformer with a ratio of 1 is inserted in the line.

At the input of time gates P1, P2 and P3, whose impedance to ground is large as compared with those of the resistances, appear now signal voltages of like polarity and like amplitude, that is to say, $-V/2$. In order to eliminate at the receiving point noise arising from the phenomena mentioned at the very beginning, a device is provided to receive signals sent over wires I, II and III only during the time intervals when the voltage of these wires with respect to ground is low and most equal in absolute value to $$\frac{Vm}{2}$$

that is to say, below V$s$, the voltage value where noise first appears.

Switching is done on wires 18, 19 and 20 and the switching device for this will now be described with reference to Figs. 1, 2 and 3.

A synchronizing voltage of frequency $f$, that is, the frequency of the alternating voltage applied to the line, and displaying a constant phase relationship with this voltage, is picked up by line 24 at the output of an auxiliary winding of bleeding coil 17; this synchronizing voltage, after passing through an adjustable phase-shifting circuit 25, is applied to a multivibrator 22 of known type which produces three pulse trains, the pulses of the respective trains being staggered in time.

These three pulse trains are applied respectively to time gates P1, P2 and P3 through lines 38, 39 and 40. A given pulse of one train follows immediately in time a pulse of another train and the pulse duration corresponds to the time necessary for the voltage with respect to ground of one of wires I, II or III to go from the value $-Vm/2$ to the value $+Vm/2$ or conversely. These values are shown as $\pm Vc$ in Fig. 3. Phase-shifting circuit 25 is so adjusted that time gate P1 is rendered conductive the moment the voltage with respect to ground on wire I goes below $Vm/2$.

The various time gates remain conductive during the intervals $a$, $b$, $c$ for time gate P1, $a'$, $b'$, $c'$ for time gate P2 and $a''$, $b''$, $c''$ for time gate P3, that is to say, during the time intervals when the voltage with respect to ground of the corresponding wires remains most equal in absolute value to $Vm/2$, thus lower than V$s$; noise does not appear on these wires and is not fed to the receiver; the difference between $Vm/2$ and V$s$ offers an additional safety margin. As the intervals $a$, $a'$, $a''$, and $b$, $b'$, $b''$ follow in immediate succession, as stated above, there is no interruption in signal reception.

Figure 2:
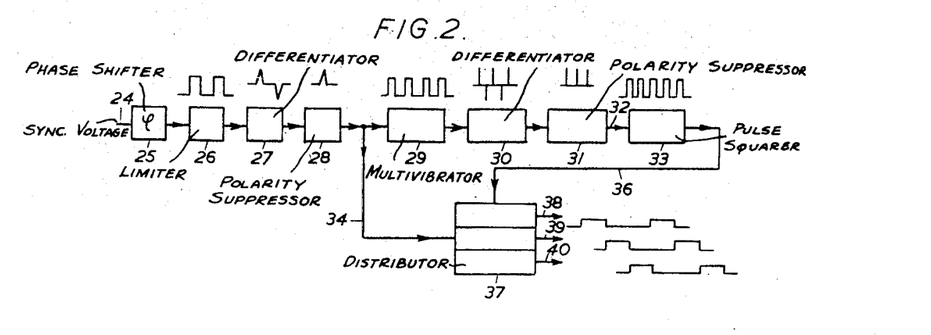
Fig. 2 is a block diagram of an electronic switching circuit chain for producing pulses required to operate the device of Fig. 1.
Figure 3:
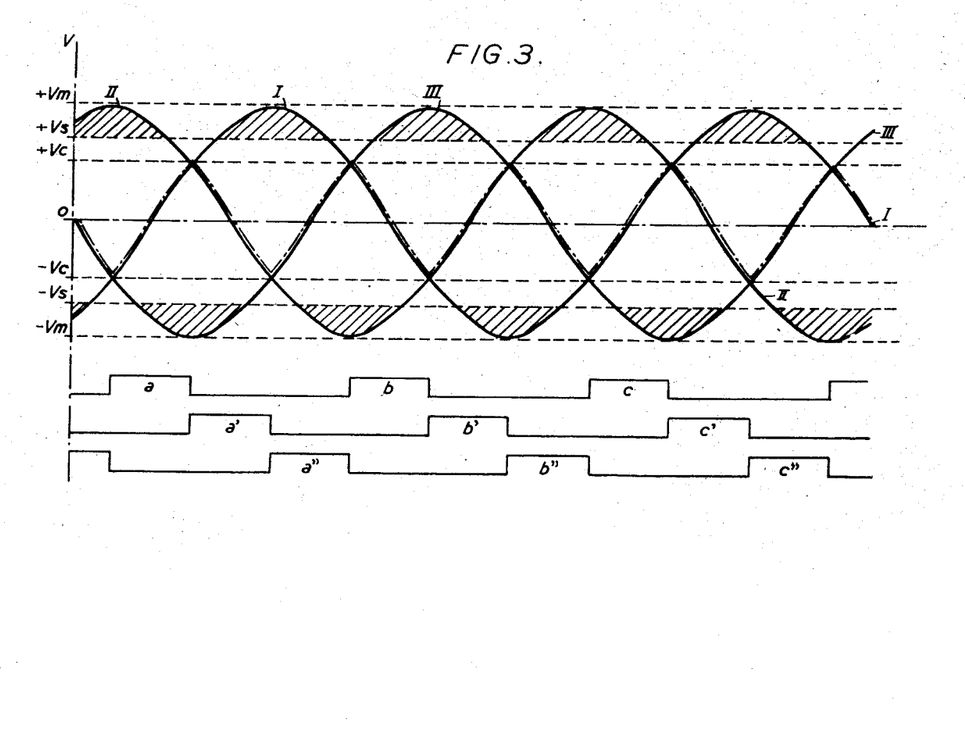
Fig. 3 is a diagram explaining the operation of the device of Fig. 1.

Fig. 2 shows another method of embodying the switch acting on the various time gates. This is an electronic circuit chain of known design.

The synchronizing voltage is received through 24 and properly phase shifted in 25. Once phase shifted, this voltage is amplified and limited in 26, thus producing rectangular pulses with the frequency of the synchronizing voltage. These pulses are applied to a differentiator 27 making it possible to obtain positive and negative pulses with steep leading edges. These pulses enter circuit 28 and the latter suppresses the pulses of one of the polarities. The remaining pulses are used to operate and synchronize a multivibrator 29; the pulses produced by said multivibrator are differentiated in 30, then reach a suppressor circuit 31, at whose output 32 only the pulses of one of the polarities appear. These pulses are applied to square-pulse generator 33. Circuit 28 also delivers synchronizing pulses through 34 to a three-way distributer controlled by generator 33 through line 36.

Distributer 37 has three outputs 38, 39 and 40 where the pulses used to render time gates P1, P2 and P3 conductive at the proper moments appear.

High-frequency signals can also be transmitted over two conductors of a three-phase or polyphase symmetrical high-voltage line.

Figure 4:
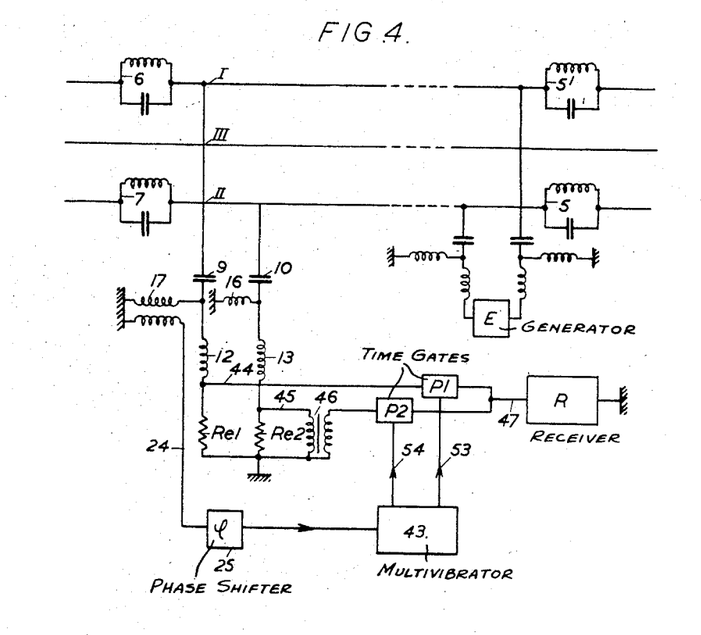
Fig. 4 is a receiving device diagram in the case of a signal transmission between "two phases"

Fig. 4 shows a diagram of this sending method in the case of a three-phase line and also shows the receiving device. Generator E excites wires I and II symmetrically by means of common devices, coupling condensers, tuning circuits, bleeding coils and parallel resonant circuits.

At the receiving point, wires I and II are grounded through two identical condensers 9 and 10, two identical tuning circuits 12 and 13 and two resistances of equal value R$e1$ and R$e2$. Identical parallel resonant circuits 6 and 7 are placed on wires I and II on the side opposite the transmission direction, and identical bleeding coils 16 and 17 fix the potential with respect to ground of the low-voltage terminals of condensers 9 and 10.

By circuit symmetry, the high-frequency signal voltages $+V$ and $-V$ taken through 44 and 45 across resistances R$e1$ and R$e2$ have the same amplitude and opposite polarities. As transformer 46 reverses the polarity of the voltage taken through 45, two voltages of like amplitude and direction are obtained at the input of time gates P1, P2. These time gates are connected to receiver R by a common line 47, the other terminal of the receiver being grounded.

The switching device comprises a symmetrical multivibrator 43 that produces two positive square-pulse trains. This multivibrator is synchronized by the voltage taken through line 24 from the output of the supplementary winding of bleeding coil 17. This voltage with the same frequency $f$ of the line voltage has a constant phase displacement with respect to the latter. A phase shifting circuit 25 varies the phase of the voltage taken from 24 before applying it to the multivibrator set to operate at frequency $2f$. The duration of each pulse is $1/4f$; the pulses follow one another in each train at $1/4f$ intervals, and a particular pulse of a train immediately follows in time a pulse of the other train.

Figure 6:
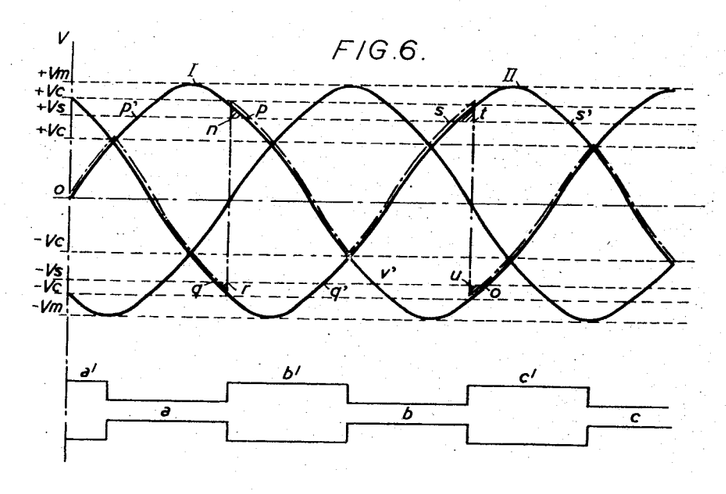
Fig. 6 is a diagram explaining the operation of the device of Fig. 4.

The phase-shifting circuit is adjusted to switch at instants corresponding to voltages with respect to ground of wires I and II equal to either $+Vm/2$ or $-Vm/2$, that is to say, $\pm Vc$ in Fig. 6, or $+\sqrt{3/2}\ Vm$ and $-\sqrt{3/2}\ Vm$, that is to say, $\pm Vc$ in Fig. 6; two consecutive instants are separated by a time interval $1/4f$ (Fig. 6). While in normal reception the noise coming from wire I during time intervals $p'p$, $v'v$, etc., and from wire II during intervals $qq'$, $ss'$, etc., would have been transmitted to the receiver, with the present device the noise intervals are much shorter, being reduced to $np$, $uv$, etc., on wire I, to $qr$, $st$, etc., on wire II, and during these intervals the maximum voltage $\sqrt{3/2}$. Since $Vm$ exceeds V$s$ slightly, the noise power remains at such a low level that the signal-to-noise ratio is distinctly improved, without any change in the number of coupling condensers and parallel resonant circuits normally used in receiving a signal sent "between phases."

Figure 5:
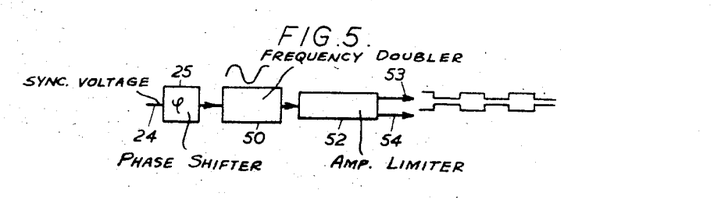
Fig. 5 is a block diagram of an electronic circuit producing pulses required by the device of Fig. 4.

The device shown in Fig. 5 can be used instead of the one just described.

The synchronizing voltage is fed in through 24; this voltage is properly phase-shifted by 25. The voltage thus phase-shifted is fed to frequency doubler 50, then amplified and limited by circuit 52; the rectangular pulses thus obtained on 53 and 54 render time gates P1 and P2 conductive according to the method described above.

The invention also applies to the case where high-frequency signals are sent over a four-phase line and where transmission is effected either between one phase and ground or between two phases. For such a four-phase line the diagram is the same as the one in Fig. 4 for transmission between phase and ground using two coupling condensers.

Figure 7:
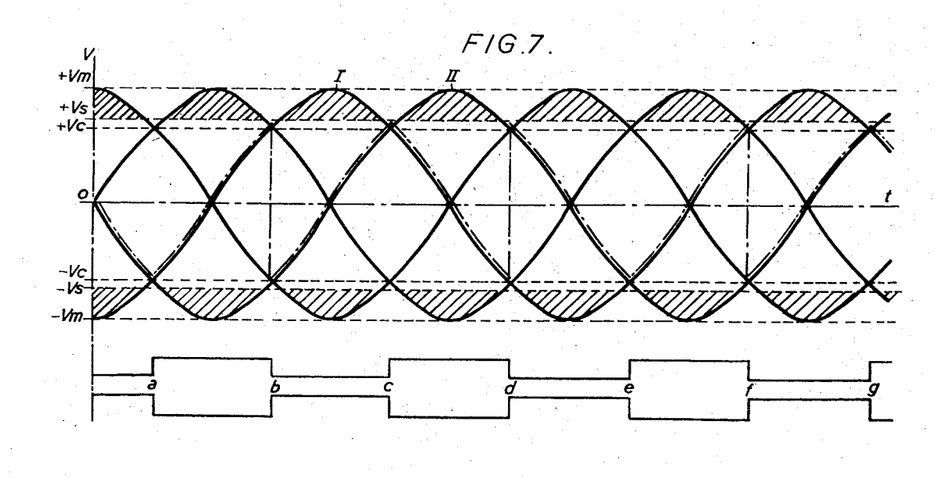
Fig. 7 is a diagram similar to that of Fig. 3 but for a four-phase line.

Fig. 7 shows, as a function of time, the instantaneous voltages with respect to ground of wires I, II, III and IV. Only two of these wires, I and II for example, are used to receive a signal sent between wires I and II. With the signal voltages taken from these two wires being converted into two voltages of like amplitude and direction applied to two time gates P1 and P2 connected to the input of receiver R, gate P1 is made conductive during time intervals $ab$, $ed$, $ef$, etc., and gate P2 during intervals $bc$, $de$, $fg$, etc.

This switching is done as shown above for reception between phases over a three-phase line, pulses being applied successively to time gates P1 and P2. The duration of these pulses is $1/4f$, where $f$ is the frequency of the voltage applied to the line. At the instants of switching, the voltages with respect to ground on wires I and II attain the value $\pm Vm\sqrt{2}$; that is to say, these voltages remain at an absolute value most always below $Vs$ and no noise whatever is transmitted to the receiver. This value is shown as $\pm Vc$ in Fig. 7.

Figure 8:
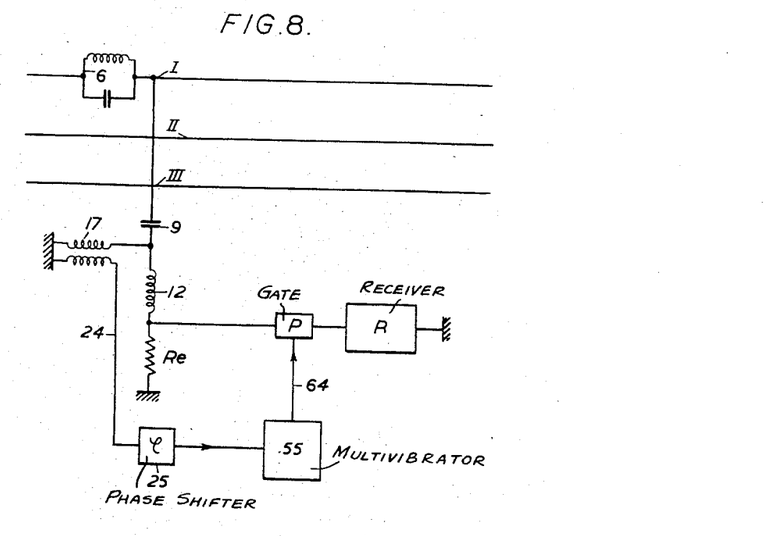
Fig. 8 is a diagram of the receiving device connected between "phase and ground" in case only a single coupling condenser is available.

Fig. 8 shows a polyphase line equipped with the usual device for receiving between phase and ground and with only one coupling condenser 9 grounded through tuning circuit 12 and resistance $re$, one parallel resonant circuit 6 and one bleeding coil 17.

Figure 10:
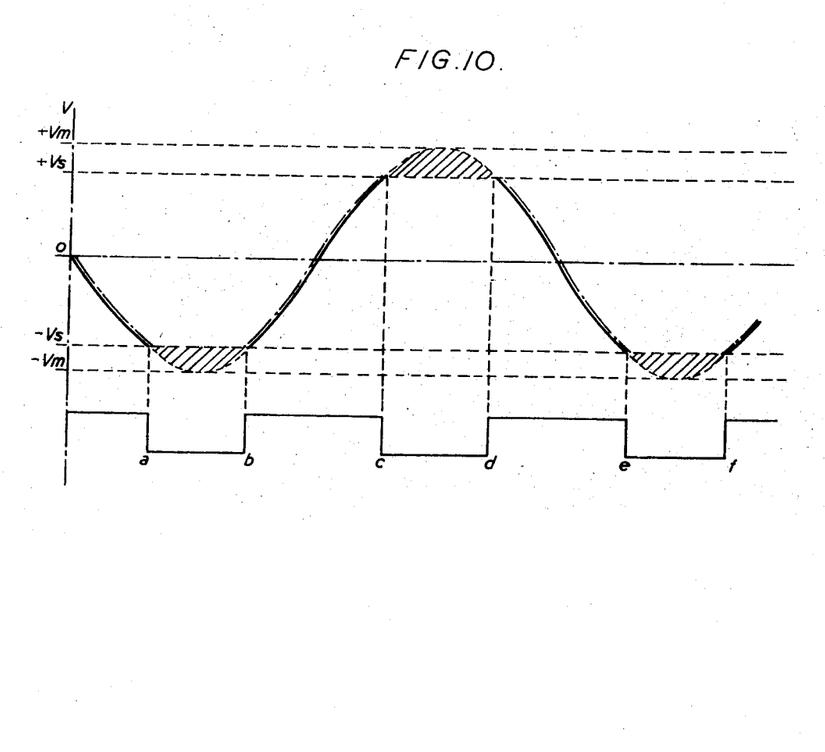
Fig. 10 is a diagram explaining the operation of Fig. 8.

Fig. 10 shows, as a function of time, the voltage with respect to ground of wire I used for reception, and time intervals $ab$, $cd$, $ef$ . . ., where, with this voltage remaining in absolute value above $Vs$, noise disappears on the wire. During these intervals the connection between wire I and the receiver can be rendered inoperative by means of a time gate P, as will be explained.

The synchronizing voltage taken through 24 from device 17 energizes after passing through phase shifter 25 an asymmetrical multivibrator 55, operating at a frequency $2f$, $f$ being the frequency of the voltage applied to the line; this multivibrator produces a train of positive pulses whose duration is shorter than that of the time interval between them. These pulses are applied through wire 64 to gate P and render the latter conductive during the noise-free time intervals $bc$, $de$, etc. Thus noise does not reach the receiver.

The signal of frequency F, not arriving at the receiver during time intervals $ab$, $cd$, etc., is modulated at frequency $2f$. This introduces into the signal-current harmonics interference components of frequencies $F \pm 2f$ or higher, but for the reception of certain signals of slowly variable frequencies it is possible to use bandpass filters with a bandwidth less than $2f$. This eliminates the interference components mentioned above, so that reception is no longer disturbed by the signal, by noise, or by modulation $2f$.

This device is particularly suitable for the transmission of intelligence by means of high-frequency carrier currents over high tension lines, 50 or 60 cycles, for example, of signals protected at the receiving end by bandpass filters of a bandwidth not greater than 80 cycles, such as telephone dial, remote control, telemetering, multitone telegraphy or teletype signals.

Figure 11:
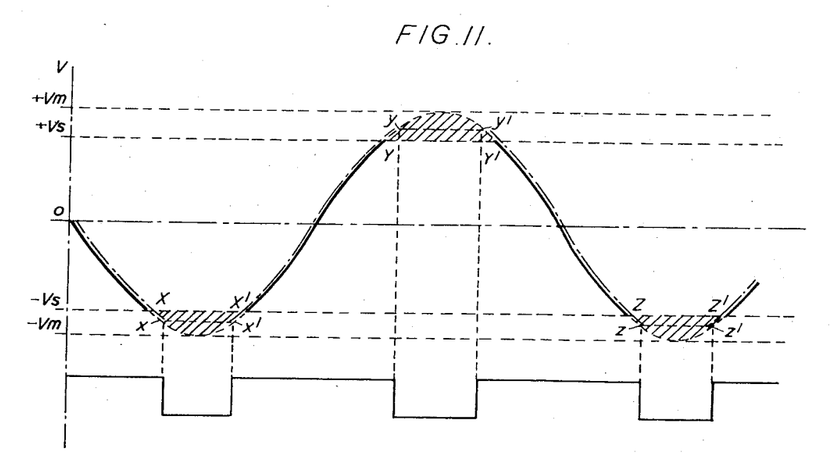
Fig. 11 is a diagram similar to that of Fig. 8 but provided a variable amplitude pulse generator is used.

In certain cases, however, it may be desirable to reduce the time intervals during which time gate P is blocked; this reduces the disturbances caused by the modulation. In Fig. 11 these intervals are reduced to $xx'$, $yy'$, $zz'$; thus the noise is not completely suppressed, as it appears during time intervals $Xx$, $x'X'$, etc.

It is quite clear that the varying of the duration of the pulses applied to the time gate (P) makes it possible to reach a compromise between disturbances due to noise and disturbances due to modulation at frequency $2f$ mentioned above and thus to use the device for receiving signals of any wave form.

Figure 9:
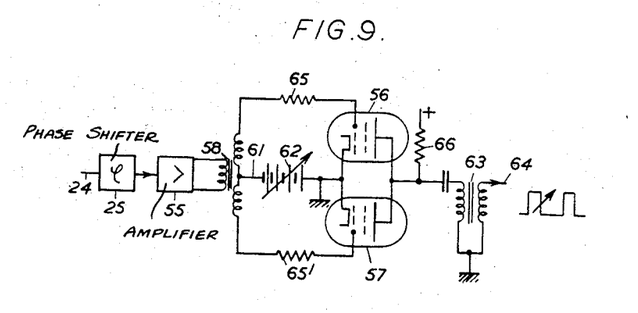
Fig. 9 is a diagram of a generator of square pulses of variable width.

To obtain pulses of variable width the embodiment shown in Fig. 9 can be used.

The synchronizing voltage received through 24 is phase-shifted by circuit 25 and amplified by 55; the output of this amplifier is equipped with an output transformer 58 that allows said voltage to excite the control grids of tubes 56 and 57 in phase opposition. The control grid of tube 56 is negatively biased by battery 62 and is alternatively excited by a secondary winding of transformer 58. The rising portion of the positive alternation neutralizes the negative grid bias and renders tube 56 conductive. The current passing through this tube increases rapidly and then becomes steady due to the presence of resistance 65. The following portion of the positive alternation causes the current of tube 56 to decrease as soon as the instantaneous grid voltage becomes negative with respect to the cathode. The tube therefore becomes non-conductive. The plate-supply voltage of tube 56 is fed through common plate load resistor 66 of tubes 56 and 57. A fairly rectangular negative pulse appears at the terminals of tube 66 during part of the exciting voltage's positive alternation, while the negative alternation has no effect on tube 56 and allows the latter to remain non-conductive. Tube 57 operates exactly like tube 56, the only difference being that the exciting voltage of its control grid is in phase opposition with respect to that of tube 56. The plates of tubes 56 and 57 are connected together to one of the terminals of resistance 66 in such a way that a negative pulse appears for each alternation of the synchronizing voltage fed in through 24. By adjusting the bias voltage 62 it is possible to obtain at 64, through transformer 63, pulses of variable width.

It is quite obvious that the above descriptions have been given only as a nonlimitative example and that modifications are possible without departing from the scope of the invention. The time gates could be blocked or rendered conductive by means of negative instead of positive pulses; the time gates for breaking the circuits connecting resistances $Re1$, $Re2$ and $Re3$ to the signal receiver could also be made to short-circuit these resistances instead of breaking the connecting circuits; or else could be made to perform both operations at the same time; these resistances could be replaced with impedances, and these could be made adjustable so that they could be adapted to the case of asymmetrical lines; the electronic switching device could be replaced with one of different design, by a synchronous rotating mechanical device for example.

What is claimed is:

1. A system for receiving intelligence signals transmitted over an alternating current power line conductor, comprising receiving means for said intelligence signals, means for coupling said conductor to said receiving means, switching means for periodically rendering said receiving means receptive to incoming signals, and timing means for actuating said switching means in synchronism with a predetermined period of the cycle of said alternating current power, said period corresponding to a time when the power voltage is a given fraction of its peak value, said timing means comprising pulse producing means, means synchronizing said pulse producing means with the frequency of said power alternating current, and phase shifting means coupled between said synchronizing means and said pulse producing means for operating said pulsing means to produce pulses only during said predetermined period of each cycle.

2. The system of claim 1, wherein said pulsing means comprising a multivibrator.

3. A receiving system for receiving signal intelligence over a three-phase alternating current power line, comprising receiving means, means coupling at least two of the conductors of said three-phase power line to said receiver, switching means for periodically rendering said receiver receptive to signals incoming over said conductors, and timing means for actuating said switching means in synchronism with a predetermined period of each cycle of said three-phase power in said conductors, said period corresponding to a time when the power voltage is a given fraction of its peak value, said timing means comprising pulse producing means, means synchronizing said pulse producing means with the frequency of said alternating current power, and phase shifting means coupled between said synchronizing means and said pulse producing means for operating said pulsing means to produce pulses only during said predetermined period of each cycle of alternating current power in said conductors.

References Cited in the file of this patent

UNITED STATES PATENTS

| | | |
|---|---|---|
| 1,928,610 | Affel | Oct. 3, 1933 |
| 2,192,061 | Woodworth | Feb. 27, 1940 |
| 2,357,995 | Blomberg, et al. | Sept. 12, 1944 |
| 2,366,537 | Livingston | Jan. 2, 1945 |
| 2,398,490 | Atwood | Apr. 16, 1946 |
| 2,428,011 | Catterjea | Sept. 30, 1947 |
| 2,594,371 | Ward | Apr. 29, 1952 |